United States Patent
Morita

(10) Patent No.: US 9,297,436 B2
(45) Date of Patent: Mar. 29, 2016

(54) VALVE AND SHOCK ABSORBER

(71) Applicant: KAYABA INDUSTRY CO., LTD., Tokyo (JP)

(72) Inventor: Yuuji Morita, Gifu (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/411,163

(22) PCT Filed: Aug. 1, 2013

(86) PCT No.: PCT/JP2013/070852
§ 371 (c)(1),
(2) Date: Dec. 24, 2014

(87) PCT Pub. No.: WO2014/024765
PCT Pub. Date: Feb. 13, 2014

(65) Prior Publication Data
US 2015/0204408 A1 Jul. 23, 2015

(30) Foreign Application Priority Data

Aug. 10, 2012 (JP) .................................. 2012-177904

(51) Int. Cl.
*F16F 9/348* (2006.01)
*F16K 15/14* (2006.01)

(52) U.S. Cl.
CPC .............. *F16F 9/3484* (2013.01); *F16K 15/144* (2013.01); *Y10T 137/7896* (2015.04)

(58) Field of Classification Search
CPC .................. F16F 9/34; F16F 9/348; F16F 9/3481–9/3488

USPC .................................. 188/320, 322.13–322.15
See application file for complete search history.

(56) References Cited

U.S. PATENT DOCUMENTS

| 4,895,229 A * | 1/1990 | Kato ...................... F16F 9/3484 |
| | | 188/280 |
| 4,972,929 A * | 11/1990 | Ivers ..................... F16F 9/3484 |
| | | 188/282.6 |
| 5,129,488 A * | 7/1992 | Furuya .................. B60G 17/08 |
| | | 188/282.6 |
| 5,316,113 A * | 5/1994 | Yamaoka ............... F16F 9/3484 |
| | | 188/282.6 |
| 5,325,942 A * | 7/1994 | Groves .................. F16F 9/3484 |
| | | 188/282.6 |
| 5,413,195 A * | 5/1995 | Murakami ............ F16F 9/3484 |
| | | 188/282.6 |
| 6,382,372 B1 * | 5/2002 | Keil ........................ F16F 9/512 |
| | | 188/322.14 |
| 2005/0092565 A1 * | 5/2005 | Asadi ..................... F16F 9/3484 |
| | | 188/322.15 |

FOREIGN PATENT DOCUMENTS

| JP | 2003-014028 A | 1/2003 |
| JP | 2003-042214 A | 2/2003 |
| JP | 2008-309214 A | 12/2008 |

* cited by examiner

*Primary Examiner* — Vishal Sahni
(74) *Attorney, Agent, or Firm* — Rabin & Berdo, P.C.

(57) ABSTRACT

A valve includes an annular disc having an opening window and a passage that extends from an inner periphery or an outer periphery of the disc to the opening window, and an annular leaf valve that is laminated onto the disc in order to open and close the opening window. The passage is covered by the leaf valve so as to function as an orifice.

7 Claims, 13 Drawing Sheets

VALVE AND SHOCK ABSORBER

TECHNICAL FIELD

The present invention relates to a valve and a shock absorber.

BACKGROUND ART

A shock absorber includes a cylinder, a piston rod inserted into the cylinder to be free to move, and a piston that is attached to an outer periphery of the piston rod and inserted into the cylinder to be free to slide, and divides an interior of the cylinder into an expansion side chamber and a contraction side chamber. The shock absorber generates damping force by applying resistance to a flow of working oil that passes between the expansion side chamber and the contraction side chamber in accordance with a valve laminated onto the piston.

In a shock absorber incorporated into a suspension of a vehicle, vibration in a resonance frequency band of a vehicle body and an axle is damped by generating damping force in response to this vibration, and as a result, passenger comfort in the vehicle can be improved. However, when excessively large damping force is generated in response to vibration in a frequency band other than the aforesaid resonance frequency band, a vibration suppression effect of a suspension spring, a rubber cushion, and so on may be impaired, and as a result, the passenger comfort may deteriorate.

JP2003-42214A discloses a shock absorber having a valve in which an orifice and a leaf valve are provided in parallel. When a piston speed is in a low speed region, the shock absorber generates damping force mainly using the orifice, and when the piston speed is in a high speed region, the leaf valve opens such that the shock absorber generates damping force mainly using the leaf valve.

As regards a damping characteristic (a characteristic of the damping force relative to the piston speed) of the shock absorber, as shown in FIG. 13, a characteristic particular to the orifice, in which the damping force is proportionate to the square of the piston speed, is obtained when the piston speed is in the low speed region, and a characteristic particular to the leaf valve, in which the damping force is proportionate to the piston speed, is obtained when the piston speed is in the high speed region. Hence, by using the orifice when the piston speed is in the low speed region, the damping force can be prevented from becoming too large, and by using the leaf valve when the piston speed is in the high speed region, the damping force can be prevented from becoming too small. Accordingly, a pseudo-damping characteristic that corresponds to the vibration frequency can be realized, and as a result, the passenger comfort of the vehicle can be improved.

SUMMARY OF INVENTION

In the damping characteristic generated by the orifice, however, the damping force varies in proportion to the square of the piston speed, and therefore, when the piston speed is extremely low (an extra low speed), the damping force of the shock absorber likewise becomes extremely small. Accordingly, vibration of the vehicle body may not be damped, and as a result, a passenger may experience discomfort.

It is an object of the present invention to provide a valve and a shock absorber with which passenger comfort in a vehicle can be improved.

According to one aspect of the present invention, a valve includes an annular disc including an opening window and a passage that extends from an inner periphery or an outer periphery of the disc to the opening window, and an annular leaf valve that is laminated onto the disc in order to open and close the opening window. The passage is covered by the leaf valve so as to function as an orifice.

According to another aspect of the present invention, a valve includes an annular first seat member, an annular first disc that is laminated onto the first seat member and includes a first opening window and a first passage that extends from an inner periphery of the first disc to the first opening window, an annular first leaf valve that is laminated onto the first disc such that an inner periphery thereof is positioned in a radial direction by the first seat member in order to open and close the first opening window, an annular second seat member, an annular second disc that is laminated onto the second seat member and includes a second opening window and a second passage that extends from an outer periphery of the second disc to the second opening window, an annular second leaf valve that is laminated onto the second disc in order to open and close the second opening window, and an annular support member that is interposed between the first leaf valve and the second leaf valve in order to support the first leaf valve such that an outer periphery thereof is capable of deflecting, and to support the second leaf valve such that an inner periphery thereof is capable of deflecting. The first disc is sandwiched between the first seat member and the first leaf valve such that the first passage functions as an orifice. The second disc is sandwiched between the second seat member and the second leaf valve such that the second passage functions as an orifice.

According to another aspect of the present invention, a shock absorber includes a cylinder, a piston that is inserted into the cylinder to be free to slide and that divides an interior of the cylinder into an expansion side chamber and the contraction side chamber, a piston rod coupled to the piston at one end, and a valve. The valve includes an annular first seat member, an annular first disc that is laminated onto the first seat member and includes a first opening window and a first passage that extends from an inner periphery of the first disc to the first opening window, an annular first leaf valve that is laminated onto the first disc such that an inner periphery thereof is positioned in a radial direction by the first seat member in order to open and close the first opening window, an annular second seat member, an annular second disc that is laminated onto the second seat member and includes a second opening window and a second passage that extends from an outer periphery of the second disc to the second opening window, an annular second leaf valve that is laminated onto the second disc in order to open and close the second opening window, and an annular support member that is interposed between the first leaf valve and the second leaf valve in order to support the first leaf valve such that an outer periphery thereof is capable of deflecting and to support the second leaf valve such that an inner periphery thereof is capable of deflecting, an inner diameter thereof being larger than an outer diameter of the piston rod. The valve is attached to an outer periphery of the piston rod so as to face one of the expansion side chamber and the contraction side chamber. A space formed by the first seat member, the second seat member, and the support member communicates with the other of the expansion side chamber and the contraction side chamber through the piston rod. The first disc is sandwiched between the first seat member and the first leaf valve such that the first passage functions as an orifice. The second disc is sandwiched between the second seat member and the second leaf valve such that the second passage functions as an orifice.

DESCRIPTION OF EMBODIMENTS

Hereinafter, embodiments of the present invention are described with reference to the accompanying drawings.

A first embodiment will now be described.

Figure 1:
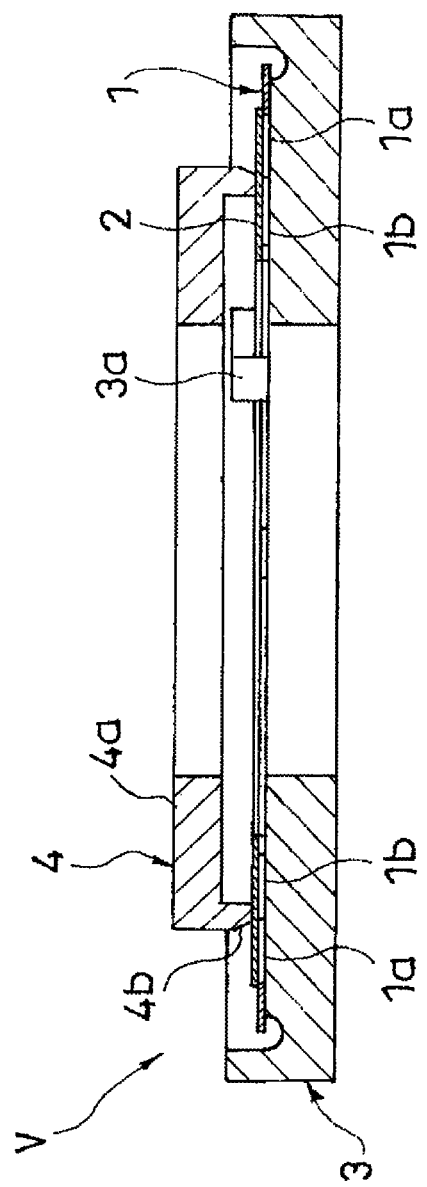
FIG. 1 is an enlarged longitudinal sectional view showing a valve according to a first embodiment of the present invention.
Figure 2:
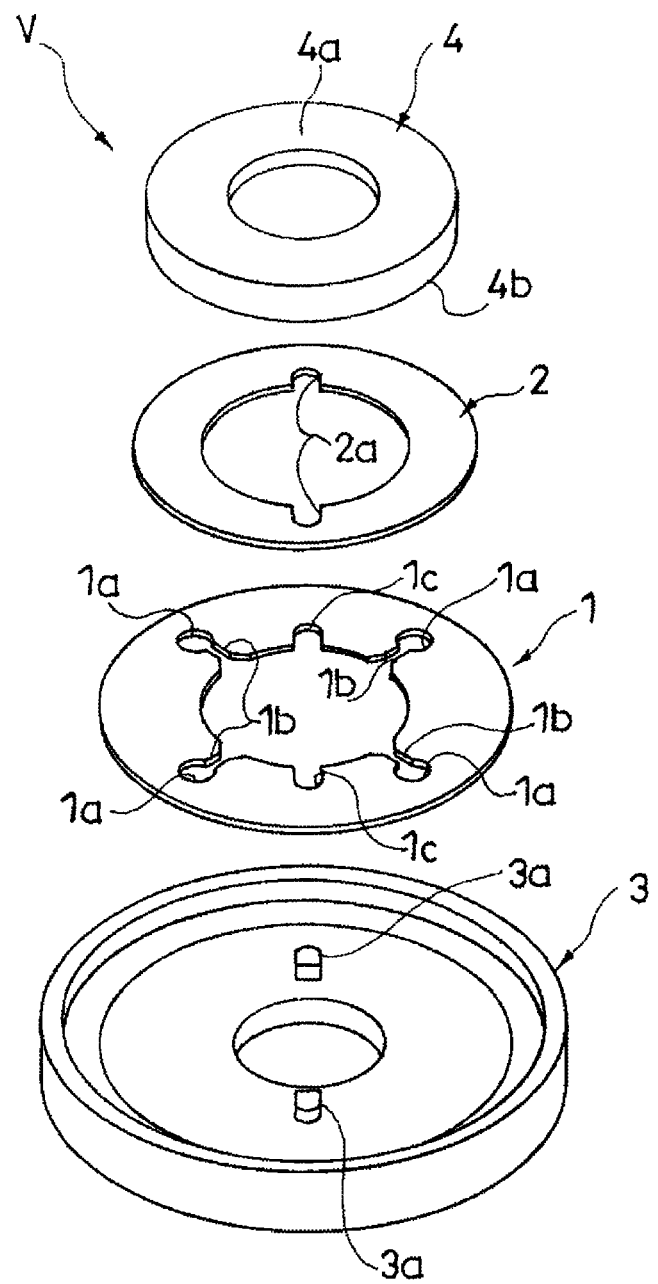
FIG. 2 is an exploded perspective view showing the valve according to the first embodiment of the present invention.
Figure 3:
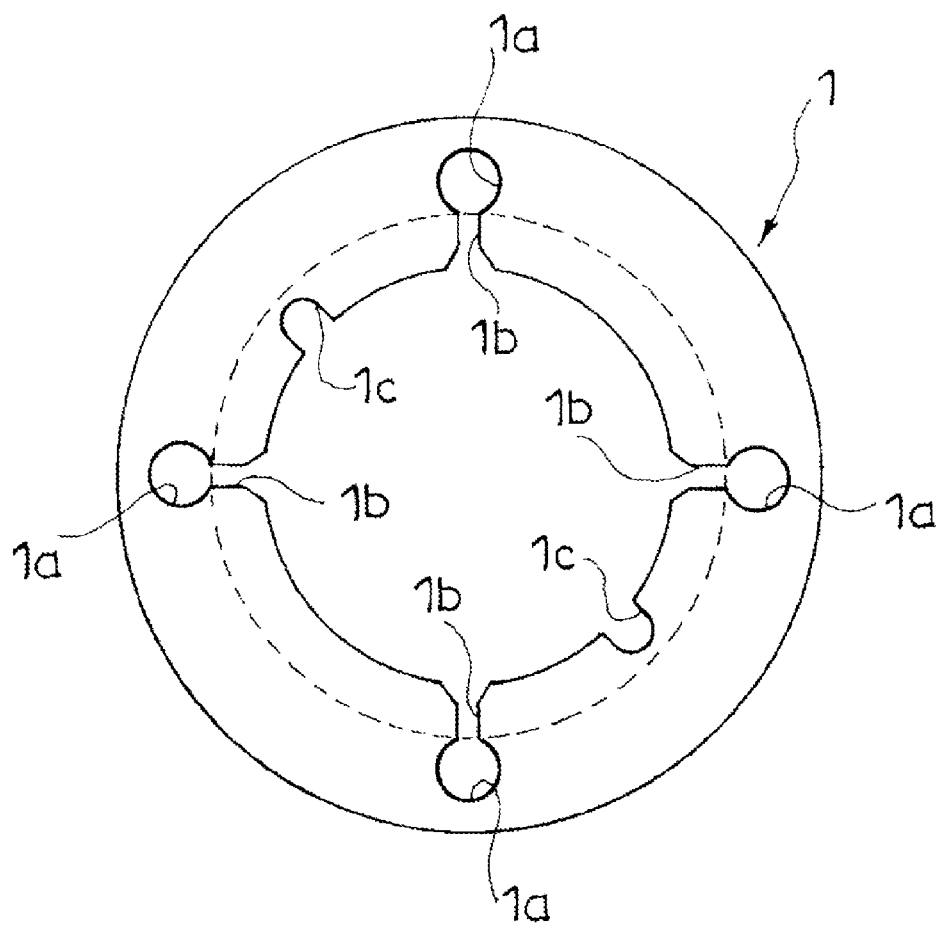
FIG. 3 is an enlarged plan view showing a disc of the valve according to the first embodiment of the present invention.

As shown in FIGS. 1 to 3, a valve V according to this embodiment includes an annular disc 1 having a circular opening window 1a and a passage 1b that extends from an inner periphery thereof to the opening window 1a, an annular leaf valve 2 that is laminated onto the disc 1 in order to open and close the opening window 1a, and an annular seat member 3 laminated onto an opposite side of the disc 1 to the leaf valve 2. When a fluid passes through the passage 1b from the inner peripheral side of the disc 1, the valve V applies resistance to a flow of the fluid using the passage 1b and the leaf valve 2.

The disc 1 is disc-shaped, and includes four opening windows 1a formed as holes that penetrate the disc 1 in an axial direction, four passages 1b that are formed as a plurality of holes extending radially from the inner periphery toward an outer peripheral side so as to communicate respectively with the corresponding opening windows 1a, and two positioning cutouts 1c. The disc 1 is laminated onto the seat member 3 such that respective lower ends of the opening windows 1a and the passages 1b in FIG. 1 are closed by the seat member 3.

The opening window 1a is not limited to a circular shape, and may take the shape of an arc extending in a circumferential direction, or the like. The shape of the opening window 1a is set such that a surface area of the opening window 1a seen from the axial direction is larger than a sectional area of the passage 1b, or in other words a value obtained by multiplying a thickness (an axial direction length) of the disc 1 by a circumferential direction width of the passage 1b.

The inner peripheral side of the passage 1b seen from the axial direction is shaped to widen gradually toward the end so that the fluid that passes through the passage 1b from the inner peripheral side is led into the passage 1b smoothly.

Figure 4:
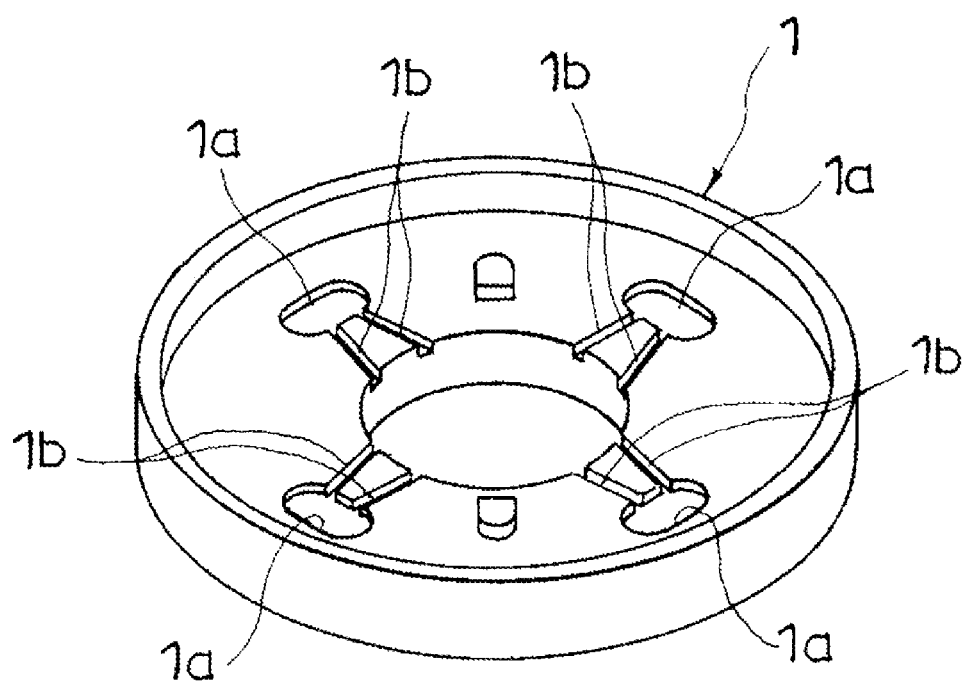
FIG. 4 is a perspective view showing a modified example of the disc of the valve according to the first embodiment of the present invention.

The numbers of provided opening windows 1a and passages 1b are not limited to four, and may be set as desired. In this embodiment, the opening windows 1a and the passages 1b are formed as holes that penetrate the disc 1 in the axial direction, and therefore a single passage 1b is provided for each opening window 1a. It should be noted that the opening windows 1a and the passages 1b provided in the disc 1 may be formed as grooves that do not penetrate the disc 1 in the axial direction. In this case, as shown in FIG. 4, the plurality of passages 1b may be connected to the opening windows 1a in an integrated disc 1 formed by integrating the disc 1 and the seat member 3.

To facilitate assembly of the valve V, the leaf valve 2 is set such that an inner peripheral diameter thereof is equal to an inner peripheral diameter of the disc 1. Cutouts 2a having an identical shape to the cutouts 1c of the disc 1 are provided in the inner periphery of the leaf valve 2 in positions that align with the cutouts 1c when the leaf valve 2 is laminated onto the disc 1. In other words, the cutouts 2a are provided in the leaf valve 2 in an identical number to the cutouts 1c of the disc 1. An outer diameter of the leaf valve 2 is set to be at least large enough to cover the opening windows 1a. In other words, in a condition where the leaf valve 2 is laminated onto the disc 1 and has not deflected, the opening windows 1a and the passages 1b are covered by the leaf valve 2.

Two projections 3a are provided on a surface of the seat member 3 onto which the disc 1 is laminated in alignment with the cutouts 1c in the disc 1 and the cutouts 2a in the leaf valve 2. The projections 3a engage with the cutouts 1c in the disc 1 and the cutouts 2a in the leaf valve 2 so that the disc 1 and the leaf valve 2 are positioned relative to the seat member 3 in a radial direction and a circumferential direction. By positioning the disc 1 using the projections 3 in this manner, the disc 1 can be positioned on the seat member 3 without blocking the passages 1b. It should be noted that the cutouts 1c, 2a and the projections 3a may be shaped as desired, as long as they are provided in respective pluralities.

When the disc 1 and the leaf valve 2 are laminated onto the seat member 3, the disc 1 is sandwiched between the seat member 3 and the leaf valve 2. Accordingly, the disc 1 contacts an end surface of the seat member 3, and therefore the respective lower ends of the opening windows 1a and the passages 1b in FIG. 1 are closed by the seat member 3. Further, the disc 1 contacts the leaf valve 2, and therefore respective upper ends of the opening windows 1a and the passages 1b in FIG. 1 are closed by the leaf valve 2.

After incorporating the disc 1 and the leaf valve 2 into the seat member 3 in this manner, an annular support member 4 is laminated onto an upper surface of the leaf valve 2 in FIG. 1, i.e. an opposite side surface to the disc. The support member 4 includes an annular main body portion 4a, and a support ring 4b provided on a lower end outer periphery of the main body portion 4a in FIG. 1 so as to support an inner peripheral side of the leaf valve 2.

The support ring 4b supports the leaf valve 2 by contacting a back surface of the leaf valve 2, i.e. the opposite side surface to the disc, whereby an outer peripheral edge thereof forms a fulcrum relative to upward deformation of the outer periphery of the leaf valve 2 in FIG. 1. An inner diameter of the support ring 4b is set such that the support ring 4b can engage with respective outer peripheries of the projections 3a, or in other words at a diameter of an imaginary circle traveling around an outer peripheral edge of the projections 3a. An outer diameter of the support ring 4b is set to be identical to a diameter of an imaginary circle (shown by a dotted line in FIG. 3) positioned around opening window side end portions of the respective passages 1b. When the support ring 4b contacts the back surface of the leaf valve 2, the outer peripheral side of the leaf valve 2 that closes the opening windows 1a is not supported by the support ring 4b, and therefore upward deflection of the outer peripheral side of the leaf valve 2 in FIG. 1 is permitted. Hence, the opening windows 1a can be opened and closed by causing only the outer peripheral side of the leaf valve 2 to deflect.

When the support member 4 is laminated onto an upper side of the leaf valve 2 in FIG. 1, the outer peripheries of the projections 3a engage with the inner periphery of the support ring 4b such that the support member 4 is positioned relative to the seat member 3 in the radial direction. As a result, a predetermined position on the back surface of the leaf valve 2 is supported, and therefore a stable damping characteristic can be realized.

The support ring 4b is required only to form the deflection fulcrum of the leaf valve 2, and therefore supports only a part of the inner peripheral side of the leaf valve 2. However, the support ring 4b may be configured to support the entire inner peripheral side of the leaf valve 2. In so doing, the inner peripheral side of the leaf valve 2 can be brought into close contact with the disc 1, thereby preventing the inner peripheral side of the leaf valve 2 from deflecting, and as a result, the inner peripheral side of the leaf valve 2 can be prevented from becoming fatigued. In this case, attachment of the support ring 4b can be facilitated by providing cutout grooves for inserting the projections 3a in the inner periphery of the support ring 4b.

When the valve V is configured as described above, the passages 1b provided in the disc 1 are formed such that only openings thereof on the inner peripheral side of the disc 1 are open, while upper and lower end sides thereof in FIG. 1 are closed by the leaf valve 2 and the seat member 3. The passages 1b therefore function as throttles, or in other words orifices.

The opening windows 1a are closed by the leaf valve 2 so that when the fluid flows into the passages 1b from the inner peripheral side of the disc 1, a pressure in the opening windows 1a increases, causing the outer periphery of the leaf valve 2 to deflect upward in FIG. 1. As a result, a gap through which the opening windows 1a are opened is formed between the disc 1 and the leaf valve 2.

Conversely, when the pressure of the fluid acts from the back surface of the leaf valve 2, or in other words the opposite side to the disc (the upper side in FIG. 1), the leaf valve 2 is pushed toward the disc 1, and therefore the opening windows 1a are maintained in a closed condition by the leaf valve 2.

When the leaf valve 2 is caused to deflect by the flow of fluid from the inner peripheral side of the disc 1, the valve V opens, and as a result, the fluid moves to the outer peripheral side of the disc 1 through the passages 1b and the opening windows 1a. When the fluid flows from the outer peripheral side to the inner peripheral side of the disc 1, on the other hand, the valve V is maintained in a condition where the leaf valve 2 closes the opening windows 1a. In other words, the valve V is a one-way valve in which the fluid flow is limited to a single direction.

When the fluid enters the passages 1b from the inner peripheral side of the disc 1 and causes the leaf valve 2 to deflect so as to flow out to the outer peripheral side of the disc 1 through the opening windows 1a, the fluid flow differs depending on whether a flow speed is high or low.

When the flow speed is low, resistance in the passages 1b functioning as orifices is low, and therefore little pressure loss is generated in the passages 1b. On the other hand, the gap formed between the leaf valve 2 and the disc 1 when the leaf valve 2 deflects is small, and therefore resistance applied to the fluid flow passing through this gap increases. Hence, the resistance applied to the fluid flow passing through the gap between the leaf valve 2 and the disc 1 is larger than the resistance applied to the fluid flow passing through the passages 1b, and therefore the pressure loss increases accordingly. In this case, the pressure loss generated by the gap between the leaf valve 2 and the disc 1 is proportionate to a flow rate.

When the flow speed is high, the passages 1b function as orifices, and therefore the pressure loss in the passages 1b is proportionate to the square of the flow speed. Accordingly, the pressure loss in the passages 1b becomes larger than the pressure loss generated by the gap between the leaf valve 2 and the disc 1.

Figure 5:
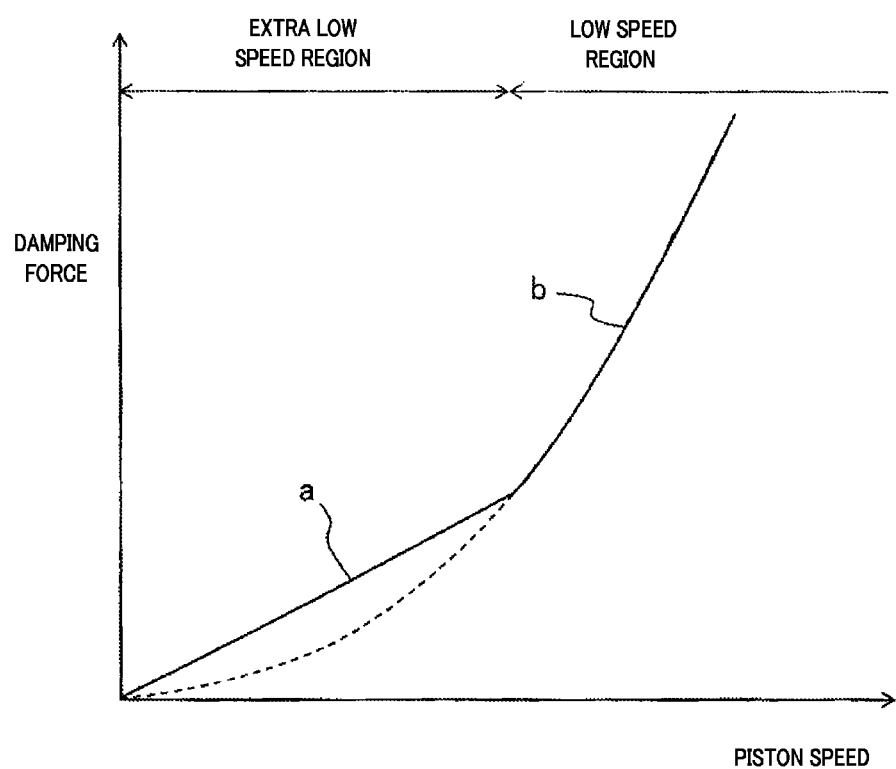
FIG. 5 is a diagram showing a damping characteristic of a shock absorber to which the valve according to the first embodiment of the present invention is applied.

Hence, when a piston speed (an expansion/contraction speed of the shock absorber) is in an extra low speed region, the pressure loss generated by the gap between the leaf valve 2 and the disc 1 is dominant, and therefore, as shown by a line a in FIG. 5, a damping characteristic of the shock absorber is such that the damping force increases proportionately as the piston speed increases. When the piston speed exceeds the extra low speed region so as to enter a low speed region, the pressure loss generated by the passages 1b becomes dominant, and therefore, as shown by a line b in FIG. 5, the damping characteristic of the shock absorber is such that the damping force increases in proportion to the square of the piston speed as the piston speed increases. In other words, in comparison with a damping characteristic of a shock absorber employing a valve according to a comparative example, shown by a dotted line in FIG. 5, the damping force generated when the piston speed is extra low can be increased.

Therefore, in a shock absorber in which the valve V is provided between the expansion side chamber and the contraction side chamber of the shock absorber or between the contraction side chamber and a reservoir chamber, sufficient damping force can be generated even when the piston speed is extremely low (extra low). Accordingly, vibration of a vehicle body can be damped sufficiently, thereby preventing a passenger from experiencing discomfort, and as a result, passenger comfort in a vehicle can be improved.

Further, by modifying the size of the opening windows 1a, a valve opening pressure of the leaf valve 2 can be modified, and in so doing, the damping force characteristic of the shock absorber when the piston speed is in the extra low speed region can be adjusted. Furthermore, by modifying the sectional area of the passages 1b, a flow passage area of the orifices can be modified, and in so doing, the damping force characteristic of the shock absorber when the piston speed exceeds the extra low speed region so as to enter the low speed region can be adjusted. Hence, by providing the disc 1 including the opening windows 1a and the passages 1b that determine the damping characteristic as a separate component to the seat member 3, the damping characteristic can be adjusted simply by replacing the disc 1. Moreover, by modifying a flexural rigidity of the leaf valve 2, an incline (an incline of the line a in FIG. 5) of the damping force characteristic of the shock absorber when the piston speed is in the extra low speed region can be adjusted.

It should be noted that in order to simplify description of the damping characteristic, the piston speed is divided into the extra low speed region, the low speed region, and a high speed region. However, a boundary speed between the extra low speed region and the low speed region may be set as desired in accordance with the sectional area of the passages 1*b* functioning as orifices and the flexural rigidity of the leaf valve 2.

A second embodiment will now be described.

In this embodiment, a structure of a valve V1, in particular a structure for opening and closing opening windows 5*a* by causing a leaf valve 6 to deflect, differs from the first embodiment. The leaf valve 2 according to the first embodiment is a so-called outward opening leaf valve in which the opening windows 1*a* open and close when the outer periphery of the leaf valve 2 deflects, whereas the leaf valve 6 according to this embodiment, as shown in FIG. 6, is a so-called inward opening leaf valve in which the opening windows 5*a* of a disc 5 open and close when an inner peripheral side of the leaf valve 6 deflects.

Figure 6:
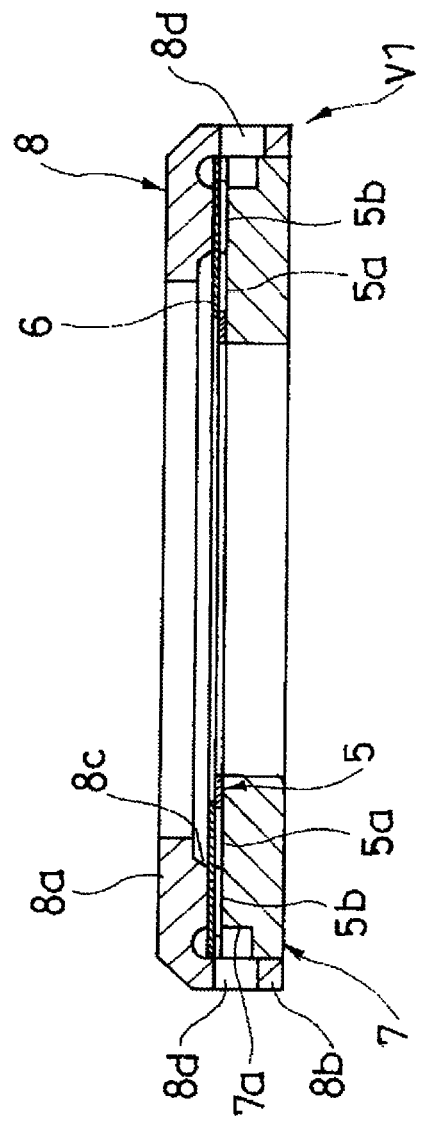
FIG. 6 is an enlarged longitudinal sectional view showing a valve according to a second embodiment of the present invention.
Figure 7:
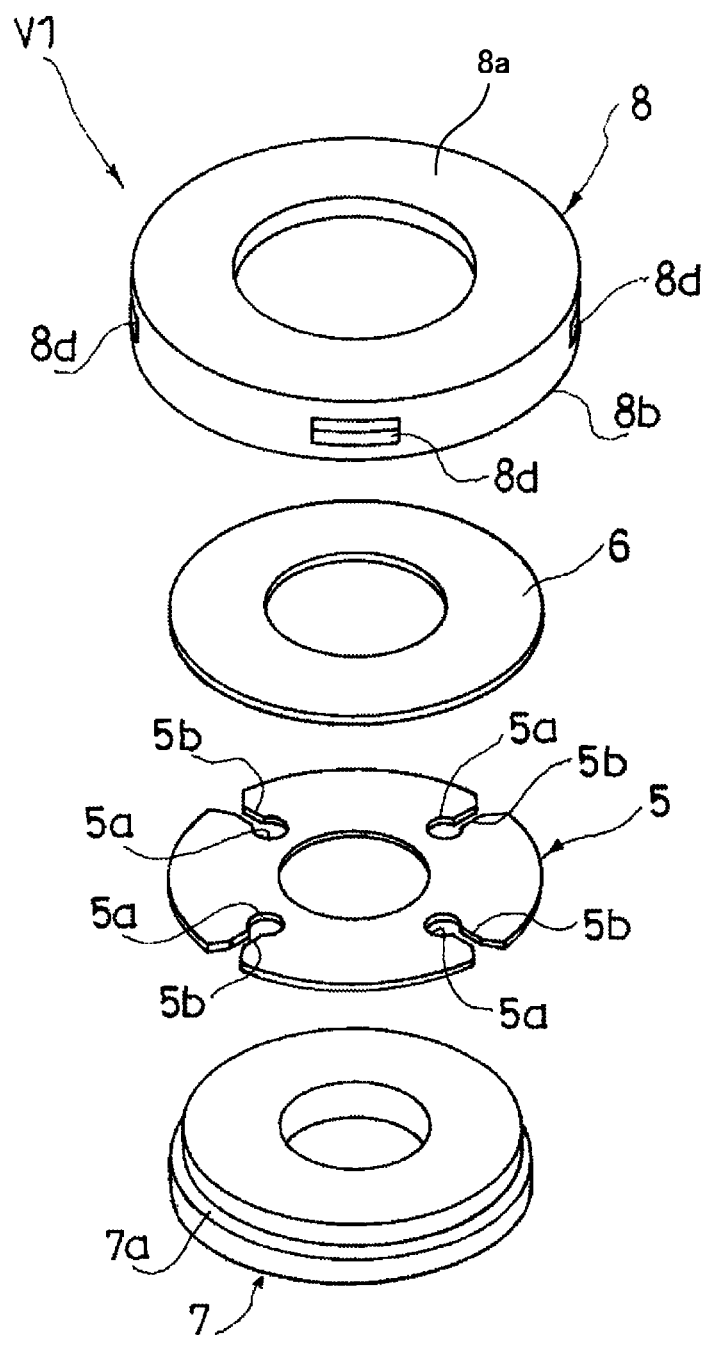
FIG. 7 is an exploded perspective view showing the valve according to the second embodiment of the present invention.
Figure 8:
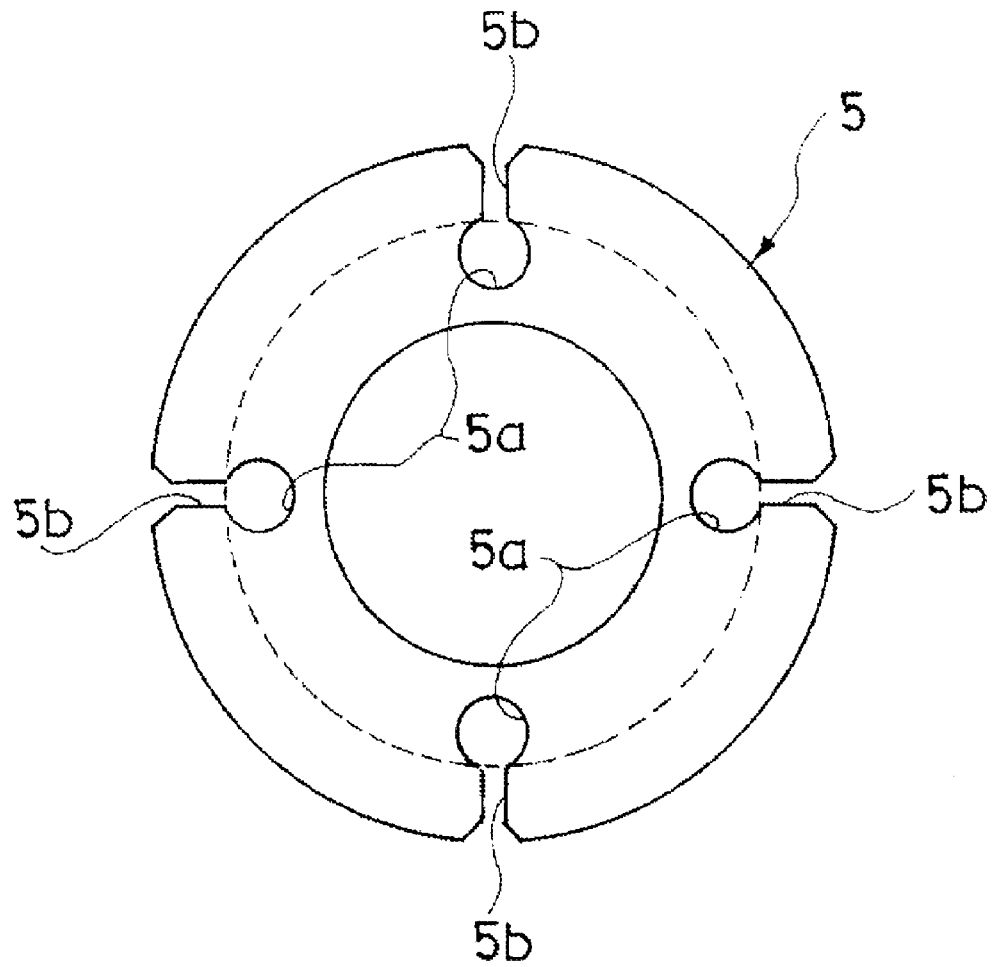
FIG. 8 is an enlarged plan view showing a disc of the valve according to the second embodiment of the present invention.

As shown in FIGS. 6 to 8, the valve V1 includes the annular disc 5 having the opening windows 5*a* and passages 5*b* that extend from an outer periphery thereof to the opening windows 5*a*, the annular leaf valve 6 that is laminated onto the disc 5 in order to open and close the opening windows 5*a*, and an annular seat member 7 laminated onto an opposite side of the disc 5 to the leaf valve. When the fluid passes through the passages 5*b* from the outer peripheral side of the disc 5, the valve V1 applies resistance to the flow of the fluid using the passages 5*b* and the leaf valve 6.

As shown in FIGS. 7 and 8, the disc 5 is disc-shaped, and includes four opening windows 5*a* formed as holes that penetrate the disc 5 in the axial direction, and four passages 5*b* that are formed as a plurality of holes extending radially from the outer periphery toward an inner peripheral side so as to communicate respectively with the corresponding opening windows 5*a*. The disc 5 is laminated onto the seat member 7 such that respective lower ends of the opening windows 5*a* and the passages 5*b* in FIG. 7 are closed by the seat member 7.

The opening window 5*a* is not limited to a circular shape, and may take the shape of an arc extending in the circumferential direction, or the like. The shape of the opening window 5*a* is set such that a surface area of the opening window 5*a* seen from the axial direction is larger than a sectional area of the passage 5*b*, or in other words a value obtained by multiplying a thickness (an axial direction length) of the disc 5 by a circumferential direction width of the passage 5*b*.

The outer peripheral side of the passage 5*b* seen from the axial direction is shaped to widen gradually toward the end so that the fluid passing through the passage 5*b* from the outer peripheral side is led smoothly into the passage 5*b*.

The numbers of provided opening windows 5*a* and passages 5*b* are not limited to four, and may be set as desired. In this embodiment, the opening windows 5*a* and the passages 5*b* are formed as holes that penetrate the disc 5 in the axial direction, and therefore a single passage 5*b* is provided for each opening window 5*a*. It should be noted that the opening windows 5*a* and the passages 5*b* provided in the disc 5 may be formed as grooves that do not penetrate the disc 5 in the axial direction. In this case, the plurality of passages 5*b* may be connected to the opening windows 5*a* in an integrated disc 5 formed by integrating the disc 5 with the seat member 7.

To facilitate assembly of the valve V1, the leaf valve 6 is set such that an inner peripheral diameter thereof is equal to an inner peripheral diameter of the disc 5. An outer peripheral diameter of the leaf valve 6 is set to be identical to an outer peripheral diameter of the disc 5 in order to position a support member 8, to be described below, in a radial direction. In other words, in a condition where the leaf valve 6 is laminated onto the disc 5 and has not deflected, the opening windows 5*a* and the passages 5*b* are covered by the leaf valve 6.

The seat member 7 has a surface onto which the disc 5 is laminated, and an annular cutout 7*a* is provided in an outer periphery of this surface in FIG. 6. When the disc 5 is laminated onto the upper end of the seat member 7 in FIG. 6, outer peripheral side ends of the passages 5*b* oppose the annular cutout 7*a* such that respective starting ends of the passages 5*b* are open.

When the disc 5 and the leaf valve 6 are laminated on the seat member 7, the disc 5 is sandwiched between the seat member 7 and the leaf valve 6. Accordingly, the disc 5 contacts an end surface of the seat member 7, and therefore the respective lower ends of the opening windows 5*a* and the passages 5*b* in FIG. 6 are almost entirely closed by the seat member 7. Further, the disc 5 contacts the leaf valve 6, and therefore respective upper ends of the opening windows 5*a* and the passages 5*b* in FIG. 6 are closed by the leaf valve 6.

After incorporating the disc 5 and the leaf valve 6 into the seat member 7 in this manner, the annular support member 8 is laminated onto an upper surface of the leaf valve 6 in FIG. 6, i.e. an opposite side surface to the disc. The support member 8 includes an annular main body portion 8*a*, a positioning tube 8*b* that is provided on a lower end outer periphery of the main body portion 8*a* in FIG. 6, and engages with the respective outer peripheries of the disc 5, the leaf valve 6, and the seat member 7 so as to position the disc 5, the leaf valve 6, and the seat member 7 in the radial direction, a support ring 8*c* provided on a lower surface of the main body portion 8*a* in FIG. 6 so as to support an outer peripheral side of the leaf valve 6, and a cutout 8*d* penetrating the positioning tube 8*b* in the radial direction.

The support ring 8*c* supports the leaf valve 6 by contacting a back surface of the leaf valve 6, i.e. the opposite side surface to the disc, whereby an inner peripheral edge thereof forms a fulcrum relative to upward deformation of the inner periphery of the leaf valve 6 in FIG. 6. An inner diameter of the support ring 8*c* is set to be identical to a diameter of an imaginary circle (shown by a dotted line in FIG. 8) positioned around opening window side end portions of the respective passages 1*b* in the disc 5. When the support ring 8*c* contacts the back surface of the leaf valve 6, the inner peripheral side of the leaf valve 6 closing the opening windows 5*a* is not supported by the support ring 8*b*, and therefore upward deflection of the inner peripheral side of the leaf valve 6 in FIG. 6 is permitted. Hence, the opening windows 5*a* can be opened and closed by causing only the inner peripheral side of the leaf valve 6 to deflect.

When the positioning tube 8*b* is engaged to the respective outer peripheries of the disc, 5, the leaf valve 6, and the seat member 7, the disc 5 and the leaf valve 6 are positioned in the radial direction relative to the support member 8. As a result, a predetermined position on the back surface of the leaf valve 6 is supported by the support ring 8*c*, and therefore a stable damping characteristic can be realized.

The support ring 8*c* is required only to form the deflection fulcrum of the leaf valve 6, and therefore supports only a part of the outer peripheral side of the leaf valve 6. However, the support ring 8*c* may be configured to support the entire outer peripheral side of the leaf valve 6. In so doing, the outer peripheral side of the leaf valve 6 can be brought into close contact with the disc 5, thereby preventing the outer peripheral side of the leaf valve 6 from deflecting, and as a result, the inner peripheral side of the leaf valve 6 can be prevented from becoming fatigued.

Further, an inner peripheral diameter of the main body portion 8a is set to be larger than the inner diameter of the leaf valve 6. As a result, the inner periphery of the leaf valve 6 can be prevented from interfering with the main body portion 8a when the inner periphery of the leaf valve 6 deflects upward in FIG. 6.

When the valve V1 is configured as described above, the passages 5b provided in the disc 5 are formed such that only openings thereof on the outer peripheral side of the disc 5 are opened, while upper and lower end sides thereof in FIG. 6 are closed by the leaf valve 6 and the seat member 7. The passages 5b therefore function as throttles, or in other words orifices.

Openings on the outer peripheral side of the disc 5 communicate with the annular cutout 7a provided in the outer periphery of the seat member 7, and the annular cutout 7a communicates with the exterior of the support member 8 via the cutouts 8d provided in the positioning tube 8b. As a result, the fluid is permitted to flow into the passages 5d from the outer peripheral side of the disc 5. It should be noted that by providing the annular cutout 7a, the passages 5d and the cutouts 8d can communicate even when respective positions thereof deviate from each other in the circumferential direction. When the passages 5d and the cutouts 8d can be enabled to face each other using another configuration, however, the annular cutout 7a may be omitted. Further, the positioning tube 8b may be provided on the seat member 7 instead of the support member 8.

The opening windows 5a are closed by the leaf valve 6 so that when the fluid flows into the passages 5b from the outer peripheral side of the disc 5, the pressure in the opening windows 5a increases, causing the inner periphery of the leaf valve 6 to deflect upward in FIG. 6. As a result, a gap is formed between the disc 5 and the leaf valve 6 such that the opening windows 5a are opened.

Conversely, when the pressure of the fluid acts from the back surface of the leaf valve 6, or in other words the opposite side to the disc (the upper side in FIG. 6), the leaf valve 6 is pushed toward the disc 5, and therefore the opening windows 5a are maintained in a closed condition by the leaf valve 6.

When the leaf valve 6 is caused to deflect by a flow of fluid from the outer peripheral side of the disc 5, the valve V1 opens, and as a result, the fluid moves to the inner peripheral side of the disc 5 through the passages 5b and the opening windows 5a. When the fluid flows from the inner peripheral side to the outer peripheral side of the disc 5, on the other hand, the valve V1 is maintained in a condition where the leaf valve 6 closes the opening windows 5a. In other words, the valve V1 is a one-way valve in which the fluid flow is limited to a single direction.

When the fluid enters the passages 5b from the outer peripheral side of the disc 5 and causes the leaf valve 6 to deflect so as to flow out to the inner peripheral side of the disc 5 through the opening windows 5a, the fluid flow differs depending on whether the flow speed is high or low.

When the flow speed is low, resistance in the passages 5b functioning as orifices is low, and therefore little pressure loss is generated by the passages 5b. On the other hand, the gap formed between the leaf valve 6 and the disc 5 when the leaf valve 6 deflects is small, and therefore resistance applied to the fluid flow passing through this gap increases. Hence, the resistance applied to the fluid flow passing through the gap between the leaf valve 6 and the disc 5 is larger than the resistance applied to the fluid flow passing through the passages 5b, and therefore the pressure loss increases accordingly. In this case, the pressure loss generated by the gap between the leaf valve 6 and the disc 5 is proportionate to the flow rate.

When the flow speed is high, the passages 5b function as orifices, and therefore the pressure loss in the passages 5b is proportionate to the square of the flow speed. Accordingly, the pressure loss in the passages 5b becomes larger than the pressure loss generated by the gap between the leaf valve 6 and the disc 5.

Hence, when the piston speed (the expansion/contraction speed of the shock absorber) is in the extra low speed region, the pressure loss generated by the gap between the leaf valve 6 and the disc 5 is dominant, and therefore, as shown by the line a in FIG. 5, the damping characteristic of the shock absorber is such that the damping force increases proportionately as the piston speed increases. When the piston speed exceeds the extra low speed region so as to enter the low speed region, the pressure loss generated by the passages 5b becomes dominant, and therefore, as shown by the line b in FIG. 5, the damping characteristic of the shock absorber is such that the damping force increases in proportion with the square of the piston speed as the piston speed increases. In other words, in comparison with the damping characteristic of the shock absorber employing the valve according to the comparative example, shown by the dotted line in FIG. 5, the damping force generated when the piston speed is extra low can be increased.

Therefore, in a shock absorber in which the valve V is provided between the expansion side chamber and the contraction side chamber of the shock absorber or between the contraction side chamber and the reservoir chamber, sufficient damping force can be generated even when the piston speed is extremely low (extra low). Accordingly, vibration of the vehicle body can be damped sufficiently, thereby preventing a passenger from experiencing discomfort, and as a result, the passenger comfort of the vehicle can be improved.

Further, by modifying the size of the opening windows 5a, the valve opening pressure of the leaf valve 6 can be modified, and in so doing, the damping force characteristic of the shock absorber when the piston speed is in the extra low speed region can be adjusted. Furthermore, by modifying the sectional area of the passages 5b, the flow passage area of the orifices can be modified, and in so doing, the damping characteristic of the shock absorber when the piston speed exceeds the extra low speed region so as to enter the low speed region can be adjusted. Hence, by providing the disc 5 including the opening windows 5a and the passages 5b that determine the damping characteristic as a separate component to the seat member 7, the damping characteristic can be adjusted simply by replacing the disc 5. Moreover, by modifying the flexural rigidity of the leaf valve 6, the incline (the incline of the line a in FIG. 5) of the damping force characteristic of the shock absorber when the piston speed is in the extra low speed region can be adjusted.

A third embodiment will now be described.

Figure 9:
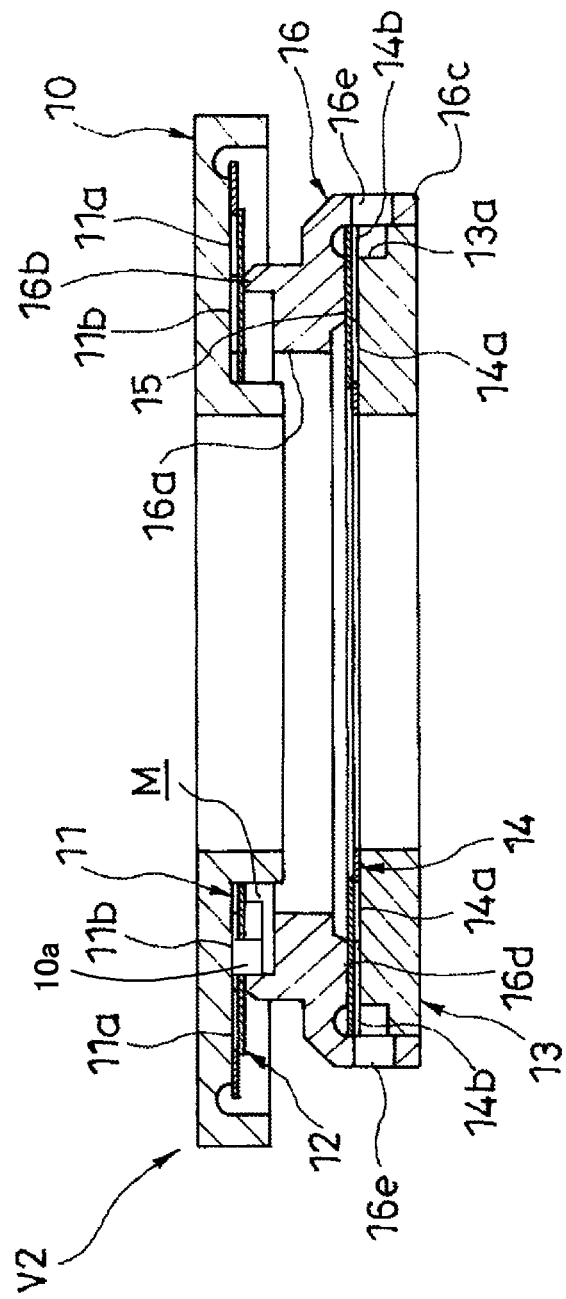
FIG. 9 is a longitudinal sectional view showing a valve according to a third embodiment of the present invention.

As shown in FIG. 9, a valve V2 according to this embodiment includes an annular first seat member 10, an annular first disc 11 that is laminated onto the first seat member 10 and includes a first opening window 11a and a passage 11b that extends from an inner periphery thereof to the opening window 11a, and an annular first leaf valve 12 that is laminated onto the first disc 11 such that an inner periphery thereof is positioned in a radial direction of the first seat member 10 in order to open and close the opening window 11a.

The valve V2 further includes an annular second seat member 13, an annular second disc 14 that is laminated onto the second seat member 13 and includes a second opening window 14a and a second passage 14b that extends from an outer periphery thereof to the second opening window 14a, an annular second leaf valve 15 that is laminated onto the second disc 14 in order to open and close the second opening window 14a, and an annular support member 16 that is interposed between the first leaf valve 12 and the second leaf valve 15 in order to support the first leaf valve 12 such that an outer periphery thereof is capable of deflecting, and support the second leaf valve 15 such that an inner periphery thereof is capable of deflecting.

The valve V2 applies resistance to a flow of fluid flowing from the inner peripheral side using the first passage 11b and the first leaf valve 12, and applies resistance to a flow of fluid flowing from the outer peripheral side using the second passage 14b and the second leaf valve 15.

The valve V2 is constructed by turning the valve V according to the first embodiment upside down and disposing the valve V opposite the valve V1 according to the second embodiment such that the support member 4 of the valve V and the support member 8 of the valve V1 are integrated into the single support member 16. The first disc 11 corresponds to the disc 1 constituting the valve V, the first leaf valve 12 corresponds to the leaf valve 2, and the first seat member 10 corresponds to the seat member 3. Further, the second disc 14 corresponds to the disc 5 constituting the valve V1, the second leaf valve 15 corresponds to the leaf valve 6, and the second seat member 13 corresponds to the seat member 7. The respective members of the valve V2 are configured basically identically to the corresponding members of the valves V, V1, and therefore, to simplify description, only parts of the respective members of the valve V2 that differ from the corresponding members of the valves V, V1 will be described.

As shown in FIG. 9, the first disc 11 is disc-shaped, and includes four first opening windows 11a formed as holes that penetrate the first disc 11 in an axial direction, four first passages 11b that are formed as a plurality of holes extending radially from the inner periphery toward the outer peripheral side so as to communicate respectively with the corresponding first opening windows 11a, and two positioning cutouts (not shown) provided in the inner periphery. The first disc 11 is laminated onto the first seat member 10 such that respective upper ends of the first opening windows 11a and the first passages 11b in FIG. 9 are closed by the first seat member 10.

Cutouts (not shown) having an identical shape to the cutouts in the first disc 11 are provided in the inner periphery of the first leaf valve 12 in positions that align with the cutouts in the first disc 11 when the first leaf valve 12 is laminated onto the first disc 11. An outer diameter of the first leaf valve 12 is set to be at least large enough to cover the first opening windows 11a. In other words, in a condition where the first leaf valve 12 is laminated onto the first disc 11 and has not deflected, the first opening windows 11a and the first passages 11b are covered by the first leaf valve 12.

The first seat member 10 includes two projections 10a that engage with the cutouts in the first disc 11 and the cutouts in the first leaf valve 12 so as to position the first disc 11 and the first leaf valve 12.

When the first disc 11 and the first leaf valve 12 are laminated onto the first seat member 10, the first disc 11 is sandwiched between the first seat member 10 and the first leaf valve 12 such that the first passages 11b function as orifices.

The second disc 14 is disc-shaped, and includes four second opening windows 14a formed as holes that penetrate the second disc 14 in the axial direction, and four second passages 14b that are formed as a plurality of holes extending radially from the outer periphery toward the inner peripheral side so as to communicate respectively with the corresponding second opening windows 14a. The second disc 14 is laminated onto the second seat member 13 such that respective lower ends of the second opening windows 14a and the second passages 14b in FIG. 9 are closed by the second seat member 13.

An outer peripheral diameter of the second leaf valve 15 is set to be identical to an outer peripheral diameter of the second disc 14 in order to position the support member 16, to be described below, in the radial direction. In other words, in a condition where the second leaf valve 15 is laminated onto the second disc 14 and has not deflected, the second opening windows 14a and the second passages 14b are covered by the second leaf valve 15.

The second seat member 13 includes a surface onto which the second disc 14 is laminated, and an annular cutout 13a is provided on an outer periphery of this surface in FIG. 9. When the second disc 14 is laminated onto an upper end of the second seat member 13 in FIG. 9, outer peripheral side ends of the second passages 14b oppose the annular cutout 13a such that respective starting ends of the second passages 14b are open.

When the second disc 14 and the second leaf valve 15 are laminated onto the second seat member 13, the second disc 14 is sandwiched between the second seat member 13 and the second leaf valve 15. Accordingly, the second disc 14 contacts an end surface of the second seat member 13, and therefore the respective lower ends of the second opening windows 14a and the second passages 14b in FIG. 9 are almost entirely closed by the second seat member 13. Further, the second disc 14 contacts the second leaf valve 15, and therefore respective upper ends of the second opening windows 14a and the second passages 14b in FIG. 9 are closed by the second leaf valve 15 such that the second passages 14b function as orifices.

The support member 16 includes an annular main body portion 16a, a first support ring 16b provided on an upper end outer periphery of the main body portion 16a in FIG. 9 so as to support an inner peripheral side of the first leaf valve 12, a positioning tube 16c that is provided on a lower end outer periphery of the main body portion 16a in FIG. 9 and engages with the respective outer peripheries of the second disc 14, the second leaf valve 15, and the second seat member 13 so as to position the second disc 14, the second leaf valve 15, and the second seat member 13 in the radial direction, a second support ring 16d provided on a lower end of the main body portion 16a in FIG. 9 so as to support an outer peripheral side of the second leaf valve 15, and a cutout 16e penetrating the positioning tube 16c in the radial direction.

The first support ring 16b supports the first leaf valve 12 by contacting a back surface of the first leaf valve 12, i.e. the opposite side surface to the disc, whereby an outer peripheral edge thereof forms a fulcrum relative to downward deformation of the outer periphery of the first leaf valve 12 in FIG. 9. When the support member 16 is laminated onto a lower side of the first leaf valve 12 in FIG. 9, the outer peripheries of the projections 10a engage with the inner periphery of the first support ring 16b such that the support member 16 is positioned relative to the first seat member 10 in the radial direction. As a result, a predetermined position on the back surface of the first leaf valve 12 is supported by the support member 16, and therefore a stable damping characteristic can be realized.

The second support ring 16d supports the second leaf valve 15 by contacting a back surface of the second leaf valve 15 on the opposite side to the disc, whereby an inner peripheral edge thereof forms a fulcrum relative to upward deformation of the inner periphery of the second leaf valve 15 in FIG. 9. When the positioning tube 16c engages with the respective outer peripheries of the second disc 14 and the second leaf valve 15, the second disc 14 and the second leaf valve 15 are positioned in the radial direction relative to the support member 16. As a result, a predetermined position on the back surface of the second leaf valve 15 is supported by the second support ring 16*d*, and therefore a stable damping characteristic can be realized.

Further, an inner peripheral diameter of the main body portion 16*a* is set to be larger than an inner diameter of the first seat member 10 and an inner diameter of the second seat member 13, with the result that a space M is formed on the inner peripheral side of the support member 16 between the first seat member 10 and the second seat member 13. The inner peripheral diameter of the main body portion 16*a* is set to be larger than an inner diameter of the second leaf valve 15. As a result, the inner periphery of the second leaf valve 15 can be prevented from interfering with the main body portion 16*a* when the inner periphery of the second leaf valve 15 deflects upward in FIG. 9.

When the fluid flows from the inner periphery to the outer periphery of the valve V2, the fluid flows into the first passages 11*b* provided in the first disc 11 through the space M. Further, the fluid pushes open the first leaf valve 12 so as to flow through the first opening windows 11*a* to the outer periphery of the valve V2. The valve V2 can thus apply resistance to the flow of fluid using the first passages 11*b* and the first leaf valve 12. On the other hand, the second leaf valve 15 is pushed against the second disc 14 by the flow of fluid, thereby closing the second opening windows 14*a*, and therefore the fluid does not pass through the second passages 14*b*.

When the fluid flows from the outer periphery to the inner periphery of the valve V2, the fluid flows into the second passages 14*b*. Further, the fluid pushes open the second leaf valve 15 so as to flow to the inner periphery of the valve V2 through the second opening windows 14*a*. The valve V3 can thus apply resistance to the flow of fluid using the second passages 14*b* and the second leaf valve 15. On the other hand, the first leaf valve 12 is pushed against the first disc 11 by the flow of fluid, thereby closing the first opening windows 11*a*, and therefore the fluid does not pass through the first opening passages 11*b*.

The valve V2 is structured such that the valve V and the valve V1 are provided in parallel. Therefore, as well as realizing similar actions and effects to the valve V and the valve V1, the valve V2 permits a bidirectional fluid flow. Hence, when the valve V2 is provided between the expansion side chamber and the contraction side chamber of the shock absorber, resistance can be applied not only to a flow of fluid traveling from the expansion side chamber toward the contraction side chamber, but also a flow of fluid travelling from the contraction side chamber toward the expansion side chamber. As a result, a damping characteristic such as that shown in FIG. 5 can be exhibited not only during an expansion operation of the shock absorber, but also during a contraction operation.

Furthermore, in the valve V2, the one-way valves V and V1 are provided in parallel, and therefore the damping characteristic obtained during passage of the fluid from the inner periphery to the outer periphery and the damping characteristic obtained during passage of the fluid from the outer periphery to the inner periphery can be set independently.

Moreover, the support member 16 is provided between the first leaf valve 12 and the second leaf valve 15, and therefore a function for supporting the first leaf valve 12 and a function for supporting the second leaf valve 15 can be consolidated into the single support member 16. As a result, a number of components of the valve V2 can be reduced, and an overall length thereof can be shortened.

Figure 10:
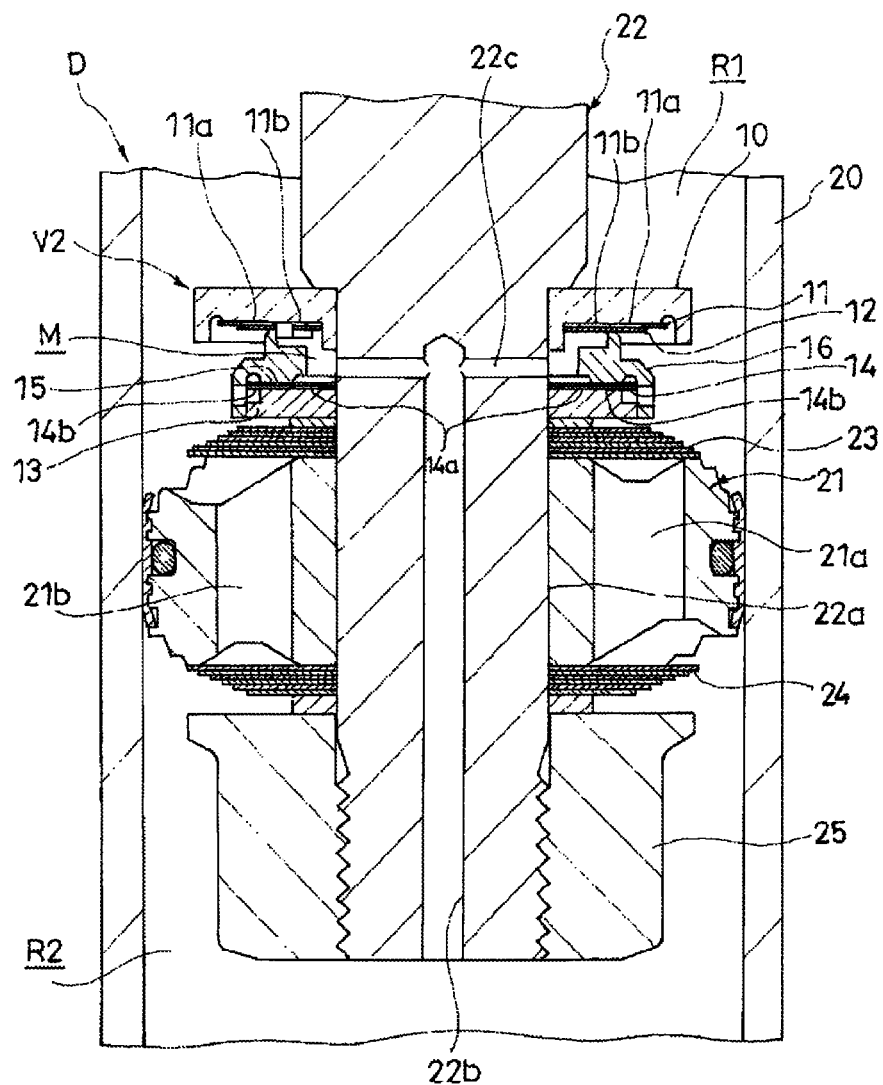
FIG. 10 is a longitudinal sectional view showing a part of a shock absorber to which the valve according to the third embodiment of the present invention is applied.

As shown in FIG. 10, the valve V2 configured as described above is attached to a tip end of a piston rod 22 of a shock absorber S together with a piston 21.

The shock absorber S includes a cylinder 20, the piston 21, which is inserted into the cylinder 20 to be free to slide and divides the interior of the cylinder 20 into an expansion side chamber R1 and a contraction side chamber R2, the piston rod 22, which is inserted into the cylinder 20 to be free to move and coupled to the piston 21 at one end, and the valve V2 attached to the piston rod 22. A fluid such as working oil, for example, is charged into the expansion side chamber R1 and the contraction side chamber R2. Instead of working oil, a liquid such as water or an aqueous solution, or a gas, may be used as the fluid. It should be noted that when the fluid is a liquid, a gas chamber and a reservoir are provided separately to compensate for volumetric variation accompanying the advance and retreat of the piston rod 22 into and out of the cylinder 20.

The piston 21 further includes main damping passages 21*a*, 21*b* that connect the expansion side chamber R1 to the contraction side chamber R2. A contraction side damping valve 23 constituted by an annular laminated leaf valve that opens and closes an upper end opening portion of the main damping passage 21*a* is laminated onto an upper side of the piston 21 in FIG. 10. An expansion side damping valve 24 constituted by an annular laminated leaf valve that opens and closes a lower end opening portion of the main damping passage 21*b* is laminated onto a lower side of the piston 21 in FIG. 10.

The piston 21, the contraction side damping valve 23, and the expansion side damping valve 24 are attached to an outer periphery of a small diameter portion 22*a* provided on a lower end of the piston rod 22 in FIG. 10, and fixed by a piston nut 25 that is screwed to a lowermost end of the small diameter portion 22*a*.

The piston rod 22 includes a hollow hole 22*b* that opens from the lower end thereof in FIG. 10, and a through hole 22*c* opened in a radial direction of the piston rod on an upper side of the piston 21 in FIG. 10 so as to communicate with the hollow hole 22*b*.

The valve V2 is laminated onto an upper side of the contraction side damping valve 23 and attached to an outer periphery of the small diameter portion 22*a* of the piston rod 22. The valve V2 is fixed to the piston rod 22 together with the piston 21, the contraction side damping valve 23, and the expansion side damping valve 24 by the piston nut 25.

An inner diameter of the support portion 16 of the valve V2 is set to be larger than an outer diameter of the small diameter portion 22*a* of the piston rod 22 so that the space M is secured between the support member 16 and the piston rod 22. When the valve V2 is attached to the piston rod 22, the space M opposes the through hole 22*c* so as to communicate with the hollow hole 22*b*. Hence, the space M communicates with the contraction side chamber R2 via the through hole 22*c* and the hollow hole 22*b*. The valve V2 is disposed above the piston 21 in FIG. 10, and therefore the outer peripheral side of the valve V2 serves as the expansion side chamber R1.

The valve V2 is provided between the expansion side chamber R1 and the contraction side chamber R2 in parallel with the main damping passages 21*a*, 21*b*. When the shock absorber S expands, fluid that flows into the second passages 14*b* from the expansion side chamber R1 pushes open the second leaf valve 15 so as to move into the space M through the second opening windows 14*a*. Further, the fluid flows into the contraction side chamber R2 through the through hole 22*c* and the hollow hole 22*b*. When the shock absorber S contracts, fluid that flows into the space M from the contraction side chamber R2 through the through hole 22*c* and the hollow hole 22b passes through the first passages 11b so as to push open the first leaf valve 12, and then flows into the expansion side chamber R1 through the first opening windows 11a.

When the piston speed of the shock absorber S is in the low speed region, the shock absorber S generates damping force corresponding to the pressure loss that occurs as the fluid passes through the valve V2. When the piston speed of the shock absorber S reaches the high speed region, the contraction side damping valve 23 and the expansion side damping valve 24 open.

Figure 11:
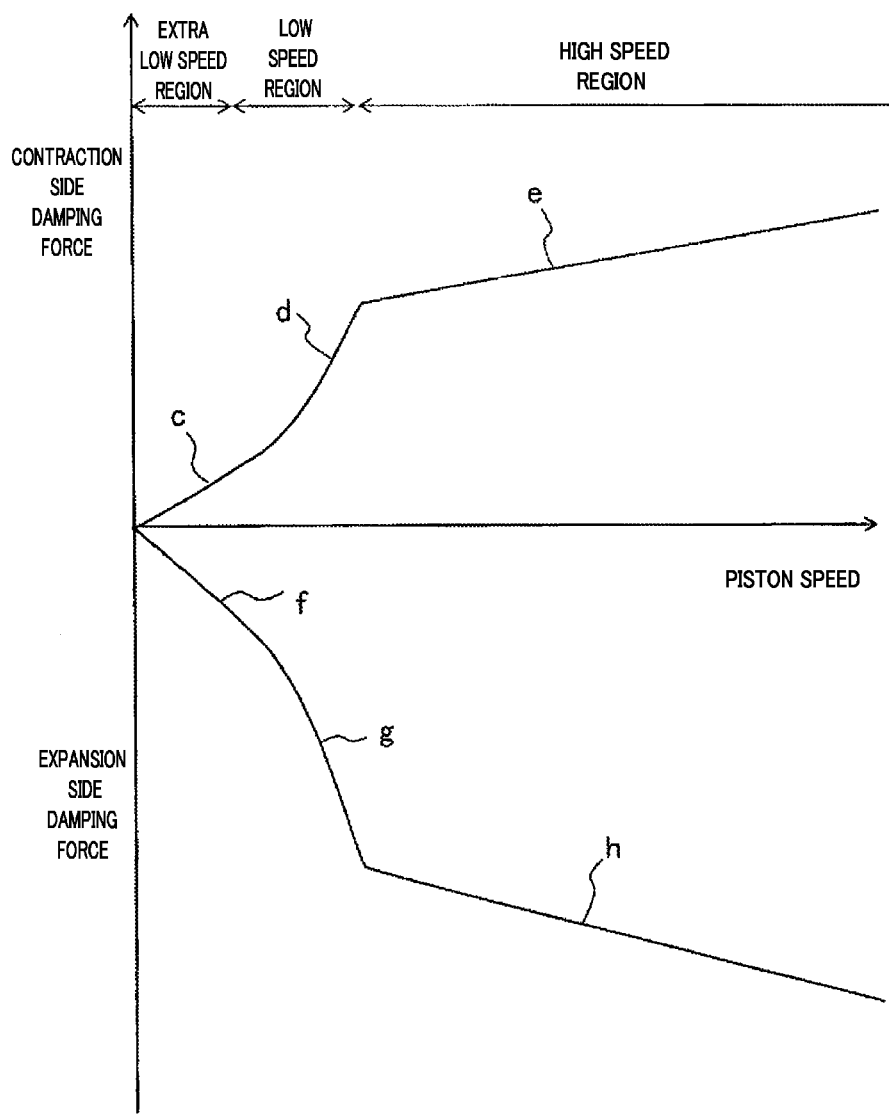
FIG. 11 is a diagram showing a damping characteristic of the shock absorber to which the valve according to the third embodiment of the present invention is applied.

Therefore, as shown in FIG. 11, when the piston speed is in the extra low speed region, the damping characteristic of the shock absorber S corresponds to a characteristic (a line c in FIG. 11) generated by the first leaf valve 12 or a characteristic (a line f in FIG. 11) generated by the second leaf valve 15, and when the piston speed exceeds the extra low speed region so as to enter the low speed region, the damping characteristic of the shock absorber S corresponds to a characteristic (a line d in FIG. 11) generated by the first passages 11b functioning as orifices or a characteristic (a line g in FIG. 11) generated by the second passages 14b functioning as orifices. Further, when the piston speed enters the high speed region, the damping characteristic of the shock absorber S corresponds to a characteristic (a line e in FIG. 11) generated by the contraction side damping valve 23 or a characteristic (a line h in FIG. 11) generated by the expansion side damping valve 24.

The piston speed at a characteristic switch point between the characteristic (the line c in FIG. 11) generated by the first leaf valve 12 and the characteristic (the line d in FIG. 11) generated by the first passages 11b and the piston speed at a characteristic switch point between the characteristic (the line f in FIG. 11) generated by the second leaf valve 15 and the characteristic (the line g in FIG. 11) generated by the second passages 14b are independent of each other, and may be set to match each other or at different values.

Similarly, the piston speed at a characteristic switch point between the characteristic (the line d in FIG. 11) generated by the first passages 11d and the characteristic (the line e in FIG. 11) generated by the contraction side damping valve 23 and the piston speed at a characteristic switch point between the characteristic (the line g in FIG. 11) generated by the second passages 14b and the characteristic (the line h in FIG. 11) generated by the expansion side damping valve 24 may likewise be set at desired values.

For example, a switch speed between the damping characteristic generated in the extra low speed region and the damping characteristic generated in the low speed region during a contraction stroke of the shock absorber S may be set as desired in accordance with the sectional area of the first passages 11b functioning as orifices and the flexural rigidity of the first leaf valve 12. A switch speed between the damping characteristic generated in the low speed region and the damping characteristic generated in the high speed region during the contraction stroke of the shock absorber S may be set as desired in accordance with the sectional area of the first passages 11b functioning as orifices and a valve opening pressure of the contraction side damping valve 23.

A switch speed between the damping characteristic generated in the extra low speed region and the damping characteristic generated in the low speed region during an expansion stroke of the shock absorber S may be set as desired in accordance with the sectional area of the second passages 14b functioning as orifices and the flexural rigidity of the second leaf valve 15. A switch speed between the damping characteristic generated in the low speed region and the damping characteristic generated in the high speed region during the expansion stroke of the shock absorber S may be set as desired in accordance with the sectional area of the second passages 14b functioning as orifices and a valve opening pressure of the expansion side damping valve 24.

Further, the valve V2 may be disposed on the contraction side chamber R2 side below the piston 21. In this case, the space M in the valve V2 may be configured to communicate with the expansion side chamber R1 through a hollow hole provided in the piston rod 22. More specifically, a lower end of the hollow hole 22b in FIG. 10 may be blocked, and a separate radial direction through hole that communicates with the hollow hole 22b may be provided on a tip end side of the piston rod 22 so as to communicate with the space M. When the valve V2 is disposed in this manner, the second seat member 13 of the valve V2 is disposed on the lower end of the piston rod 22, and therefore the second seat member 13 functions as a piston nut. As a result, the number of components can be reduced. It should be noted that when the valve is disposed in the manner described above, the first leaf valve 12 and the first passages 11b generate damping force when the shock absorber S expands, while the second leaf valve 15 and the second passages 14b generate damping force when the shock absorber S contracts.

The embodiments of the present invention described above are merely illustration of some application examples of the present invention and not of the nature to limit the technical scope of the present invention to the specific constructions of the above embodiments.

For example, the valve V2 may be incorporated into a damping force regulating shock absorber S1. In this case, as shown in FIG. 12, the shock absorber S1 includes a cylinder 30, a piston 31 that is inserted into the cylinder 30 to be free to slide and divides the interior of the cylinder 30 into an expansion side chamber R3 and a contraction side chamber R4, a piston rod 32 that is inserted into the cylinder 30 to be free to move and coupled at one end to the piston 21, main damping passages 31a, 31b provided in the piston 31 so as to connect the expansion side chamber R3 to the contraction side chamber R4, a hollow hole 32b that opens from a tip end of the piston rod 32 so as to communicate with the contraction side chamber, a partitioning member 33 that is attached to the outer periphery of the piston rod 32 on the expansion side chamber side of the piston 31, the valve V2, which is interposed between the piston 31 and the partitioning member 33 on the outer periphery of the piston rod 32, a tubular cap portion 17b that is provided on a first seat member 17 of the valve V2 and fitted to an outer periphery of the partitioning member 33, a chamber L formed by the partitioning member 33 and the first seat member 17, auxiliary damping passages 33a, 33b formed in the partitioning member 33 to connect the chamber L to the expansion side chamber R3, a first bypass port 32c provided in the piston rod 32 to connect the hollow hole 32b to the chamber L, a second bypass port 32d provided in the piston rod 32 to connect the hollow hole 32b to the space M in the valve V2, and a rotary valve RV that is housed in the hollow hole 32b to be capable of rotating in a circumferential direction in order to open and close the first bypass port 32c and the second bypass port 32d.

Similarly to the shock absorber S, a fluid such as working oil, for example, is charged into the expansion side chamber R3 and the contraction side chamber R4. Further, a gas chamber and a reservoir are provided separately to compensate for volumetric variation occurring when the piston rod 32 advances and retreats into and out of the cylinder 30.

Figure 12:
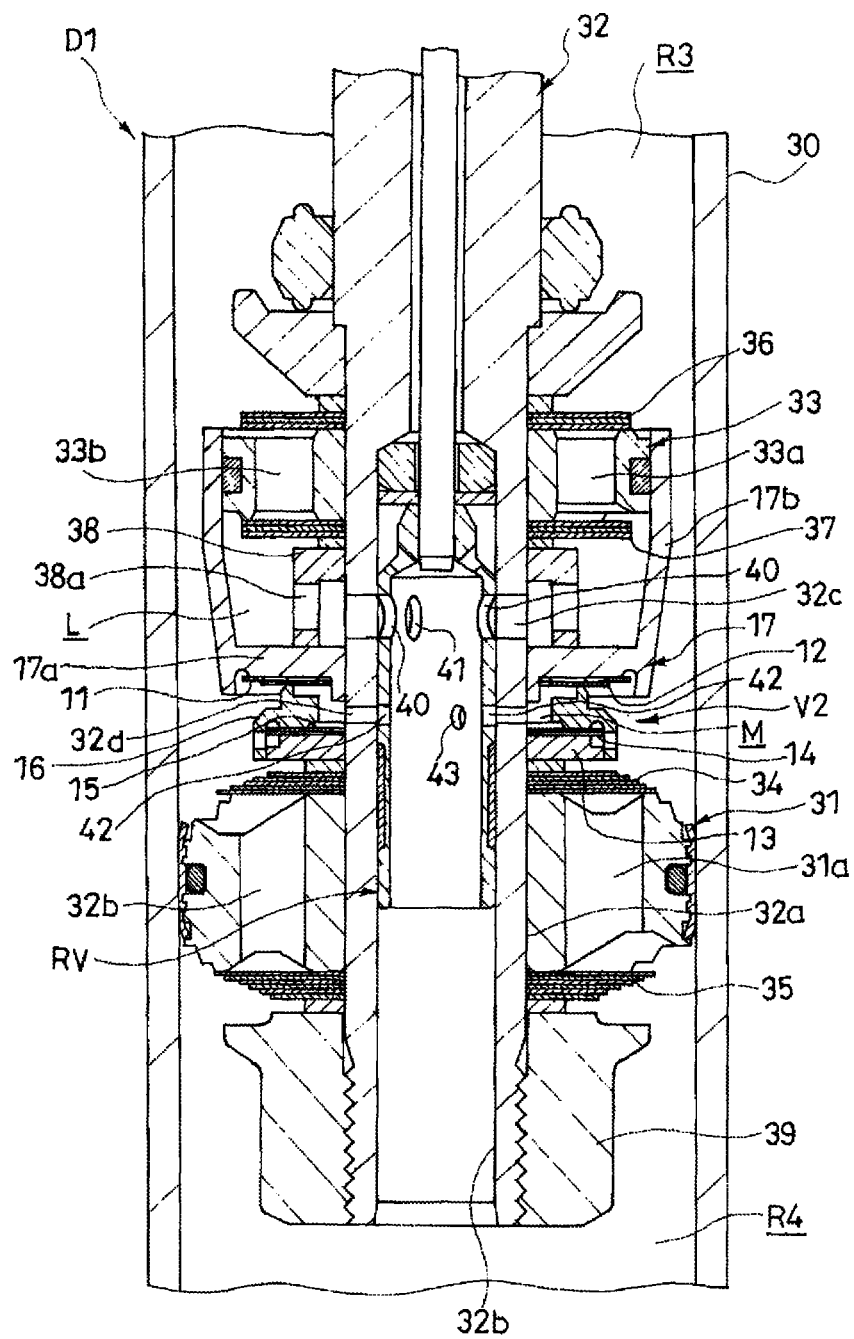
FIG. 12 is a longitudinal sectional view showing a modified example of the shock absorber to which the valve according to the third embodiment of the present invention is applied.
Figure 13:
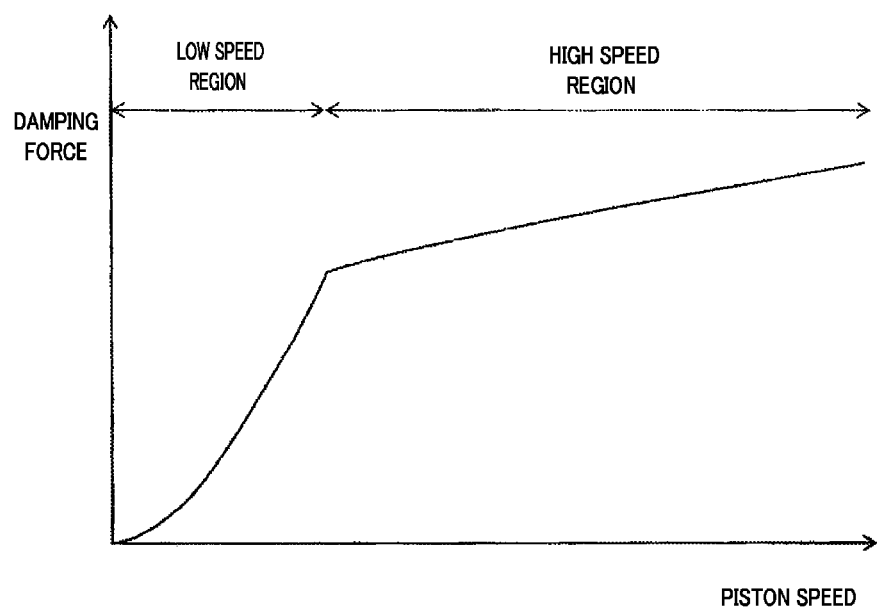
FIG. 13 is a diagram showing a damping characteristic of a shock absorber into which a valve according to a comparative example is incorporated.

A main contraction side damping valve 34 constituted by an annular laminated leaf valve that opens and closes an upper end opening portion of the main damping passage 31a is laminated onto an upper side of the piston 31 in FIG. 12. A main expansion side damping valve 35 constituted by an annular laminated leaf valve that opens and closes a lower end opening portion of the main damping passage 31b is laminated onto a lower side of the piston 31 in FIG. 12.

An auxiliary contraction side damping valve 36 constituted by an annular laminated leaf valve that opens and closes an upper end opening portion of the auxiliary damping passage 33a is laminated onto an upper side of the partitioning member 33 in FIG. 12. An auxiliary expansion side damping valve 37 constituted by an annular laminated leaf valve that opens and closes a lower end opening portion of the auxiliary damping passage 33b is laminated onto a lower side of the partitioning member 33 in FIG. 12.

The valve V2 is disposed between the main contraction side damping valve 34 and the auxiliary expansion side damping valve 37, and differs partially from the valve V2 described above in the shape of the first seat member 17. In the first seat member 17 of the valve V2, the tubular cap portion 17b is provided on a back surface of a seat main body 17a having an identical shape to the first seat member 10. The partitioning member 33 is fitted to an inner periphery of the cap portion 17b.

A spacer 38 formed in a closed-end tubular shape is interposed between the auxiliary expansion side damping valve 37 and the seat main body 17a of the first seat member 17. The spacer 38 includes a through hole 38a that connects the chamber L to the interior of the spacer 38.

The piston 31, the main contraction side damping valve 34, the main expansion side damping valve 35, the valve V2, the spacer 38, the auxiliary contraction side damping valve 36, the partitioning member 33, and the auxiliary expansion side damping valve 37 are, in a laminated condition, attached to the outer periphery of the small diameter portion 32a provided on the lower end of the piston rod 32, and fixed to the piston rod 32 by a piston nut 39.

The piston rod 32 includes the hollow hole 32b that opens from the lower end thereof. The hollow hole 32b communicates with the chamber L via the first bypass port 32c opened from the side of the piston rod 32, and communicates with the space M via the second bypass port 32d opened from the side of the piston rod 32.

The auxiliary damping passages 33a, 33b are provided between the expansion side chamber R3 and the contraction side chamber R4 parallel to the main damping passages 31a, 31b. Similarly, the valve V2 is provided between the expansion side chamber R3 and contraction side chamber R4 parallel to the main damping passages 31a, 31b.

The tubular rotary valve RV inserted into the hollow hole 32b to be free to slide in the circumferential direction includes valve ports 40, 41 provided in positions capable of facing the first bypass port 32c in order to connect the interior of the rotary valve RV to the exterior, and valve ports 42, 43 provided in positions capable of facing the second bypass port 32b in order to connect the interior of the rotary valve RV to the exterior. The valve port 40 and the valve port 42 are drilled so as to be collinear in the axial direction. The valve port 41 and the valve port 43 are drilled in positions deviating from each other in the circumferential direction, and in positions deviating from the valve ports 40, 42 in the circumferential direction.

By rotating the rotary valve RV in the circumferential direction so that the valve port 40 faces the first bypass port 32c and the valve port 42 faces the second bypass port 32d, the first bypass port 32c communicating with the auxiliary damping passages 33a, 33b and the second bypass port 32d communicating with the valve V2 are opened. As a result, the auxiliary damping passages 33a, 33b and the valve V2 disposed parallel to the main damping passages 31a, 31b can be caused to function effectively.

When the rotary valve RV is rotated in the circumferential direction so that the valve port 41 faces the first bypass port 32c and the second bypass port 32d is closed by a side face of the rotary valve RV, a flow passage communicating with the valve V2 is blocked, and therefore the main damping passages 31, 31b and the auxiliary damping passages 33a, 33b can be caused to function effectively alone.

Furthermore, when the rotary valve RV is rotated in the circumferential direction so that the first bypass port 32c is closed by the side face of the rotary valve RV and the valve port 43 faces the second bypass port 32d, a flow passage communicating with the auxiliary damping passages 33a, 33b is blocked, and therefore the main damping passages 31a, 31b and the valve V2 can be caused to function effectively alone.

Moreover, when the rotary valve RV is rotated in the circumferential direction so that the first bypass port 32c and the second bypass port 32d are blocked by the side face of the rotary valve RV, a flow passage communicating with the auxiliary damping passages 33a, 33b and the valve V2 is blocked, and therefore the main damping passages 31, 31b can be caused to function effectively alone.

By applying the valve V2 to the shock absorber S1 thus configured and operating the rotary valve RV, setting can be performed to determine whether or not to cause the auxiliary damping passages 33a, 33b and the valve V2 to function, and in so doing, the damping force can be adjusted.

Further, the cap portion 17b is integrated with the first seat member 17 of the valve V2, and there is therefore no need to provide a separate cap to form the chamber L. As a result, the number of components can be reduced.

The present application claims a priority based on Japanese Patent Application No. 2012-177904 filed with the Japan Patent Office on Aug. 10, 2012, all the contents of which are hereby incorporated by reference.

The invention claimed is:

1. A valve comprising:
   an annular disc including an opening window and a passage that extends from an inner periphery of the disc or an outer periphery of the disc to the opening window;
   an annular leaf valve that is laminated onto the disc in order to open and close the opening window;
   a support member that is laminated onto a surface of the leaf valve on an opposite side to the disc, and supports the leaf valve so that only the opening window is capable of opening; and
   a seat member that is laminated onto a surface of the disc on an opposite side to the leaf valve,
   wherein:
   the opening window and the passage are formed from holes penetrating the disc in an axial direction,
   the disc is sandwiched between the seat member and the leaf valve such that the passage functions as an orifice, and
   the seat member includes a projection that engages with the disc, the leaf valve, and the support member to position the disc, the leaf valve, and the support member in a radial direction as well as to prevent the disc from rotating.

2. A valve comprising:
   an annular disc including an opening window and a passage that extends from an inner periphery of the disc or an outer periphery of the disc to the opening window;

an annular leaf valve that is laminated onto the disc in order to open and close the opening window;
a support member that is laminated onto a surface of the leaf valve on an opposite side to the disc, and supports the leaf valve so that only the opening window is capable of opening; and
a seat member that is laminated onto a surface of the disc on an opposite side to the leaf valve, wherein:

the opening window and the passage are formed from holes penetrating the disc in an axial direction, the disc is sandwiched between the seat member and the leaf valve such that the passage functions as an orifice, and the seat member includes a positioning tube that engages with outer peripheries of the disc, the leaf valve, and the support member to position the disc, the leaf valve, and the support member in a radial direction.

3. A valve comprising:
an annular first seat member;
an annular first disc that is laminated onto the first seat member and includes a first opening window and a first passage that extends from an inner periphery of the first disc to the first opening window;
an annular first leaf valve that is laminated onto the first disc such that an inner periphery thereof is positioned in a radial direction by the first seat member in order to open and close the first opening window;
an annular second seat member;
an annular second disc that is laminated onto the second seat member and includes a second opening window and a second passage that extends from an outer periphery of the second disc to the second opening window;
an annular second leaf valve that is laminated onto the second disc in order to open and close the second opening window; and
an annular support member that is interposed between the first leaf valve and the second leaf valve in order to support the first leaf valve such that an outer periphery thereof is capable of deflecting, and to support the second leaf valve such that an inner periphery thereof is capable of deflecting, wherein:

the first disc is sandwiched between the first seat member and the first leaf valve such that the first passage functions as an orifice; and
the second disc is sandwiched between the second seat member and the second leaf valve such that the second passage functions as an orifice.

4. A shock absorber comprising:
a cylinder;
a piston that is inserted into the cylinder to be free to slide, and that divides an interior of the cylinder into an expansion side chamber and a contraction side chamber;
a piston rod coupled to the piston at one end; and
a valve including:
an annular first seat member;
an annular first disc that is laminated onto the first seat member and includes a first opening window and a first passage that extends from an inner periphery of the first disc to the first opening window;
an annular first leaf valve that is laminated onto the first disc such that an inner periphery thereof is positioned in a radial direction by the first seat member in order to open and close the first opening window;
an annular second seat member;

an annular second disc that is laminated onto the second seat member and includes a second opening window and a second passage that extends from an outer periphery of the second disc to the second opening window;
an annular second leaf valve that is laminated onto the second disc in order to open and close the second opening window; and
an annular support member that is interposed between the first leaf valve and the second leaf valve in order to support the first leaf valve such that an outer periphery thereof is capable of deflecting, and to support the second leaf valve such that an inner periphery thereof is capable of deflecting, an inner diameter thereof being larger than an outer diameter of the piston rod, wherein:

the valve is attached to an outer periphery of the piston rod so as to face one of the expansion side chamber and the contraction side chamber;
a space, formed by the first seat member, the second seat member, and the support member, communicates with the other of the expansion side chamber and the contraction side chamber through the piston rod;
the first disc is sandwiched between the first seat member and the first leaf valve such that the first passage functions as an orifice; and
the second disc is sandwiched between the second seat member and the second leaf valve such that the second passage functions as an orifice.

5. The shock absorber according to claim 4, wherein:
the support member includes a tubular positioning tube that positions the second disc and the second leaf valve in the radial direction when the second disc and the second leaf valve are fitted thereto; and
the positioning tube includes a cutout that opens from an outer periphery thereof in order to communicate with the second passage.

6. The shock absorber according to claim 4, wherein the first seat member includes a projection for positioning the first disc, the first leaf valve, and an inner periphery of the support member in the radial direction.

7. The shock absorber according to claim 4, further comprising:
a main damping passage provided in the piston to connect the expansion side chamber to the contraction side chamber;
a hollow hole that opens from a tip end of the piston rod in order to communicate with the contraction side chamber;
a partitioning member attached to an outer periphery of the piston rod on an expansion side chamber side of the piston;
a tubular cap portion provided on the first seat member and fitted to an outer periphery of the partitioning member;
a chamber formed from the partitioning member and the first seat member;
an auxiliary damping passage formed in the partitioning member in order to connect the chamber to the expansion side chamber;
a first bypass port provided in the piston rod to connect the hollow hole to the chamber;
a second bypass port provided in the piston rod to connect the hollow hole to the space; and
a rotary valve inserted into the hollow hole to be capable of rotating in a circumferential direction in order to open and close the first bypass port and the second bypass port.

* * * * *